Nov. 6, 1923.

R. H. TAYLOR 1,473,260

INFLATABLE BALL

Filed Feb. 8, 1922

INVENTOR:
Rex H. Taylor
by Macleod, Calvert, Copeland & Dike
Attys.

Patented Nov. 6, 1923.

1,473,260

UNITED STATES PATENT OFFICE.

REX H. TAYLOR, OF ROCHESTER, NEW YORK.

INFLATABLE BALL.

REISSUED

Application filed February 3, 1922. Serial No. 535,102.

*To all whom it may concern:*

Be it known that I, REX H. TAYLOR, a citizen of the United States, residing at Rochester, county of Monroe, State of New York, have invented a certain new and useful Improvement in Inflatable Balls, of which the following is a specification, reference being had therein to the accompanying drawings.

The invention relates to a new and improved inflatable ball. It has especial reference to balls, such as footballs, basket balls and balls for gymnasium purposes. Balls of this type usually have a cover of leather or fabric within which is a rubber bladder which is impervious to air and which is inflated to give the ball whatever degree of hardness is required. The present invention relates particularly to the bladder and to the method of combining the valve with the bladder. One object of the invention is to provide such a construction and combination that the stem through which the bladder is inflated extends inwardly and that the ball can be inflated to any predetermined degree of hardness.

One feature of the invention consists in making the stem through which the bladder is inflated of rubber integral with the bladder itself and extending inwardly into the interior of the bladder. Another feature of the invention consists in permanently securing the valve stem within the said rubber stem. Other features of the invention will be more particularly set forth hereinafter and claimed at the end of the specification.

The invention will be fully understood from the following description when taken in connection with the accompanying drawings, and the novel features thereof will be pointed out and clearly defined in the claims at the close of this specification.

Figure 1:
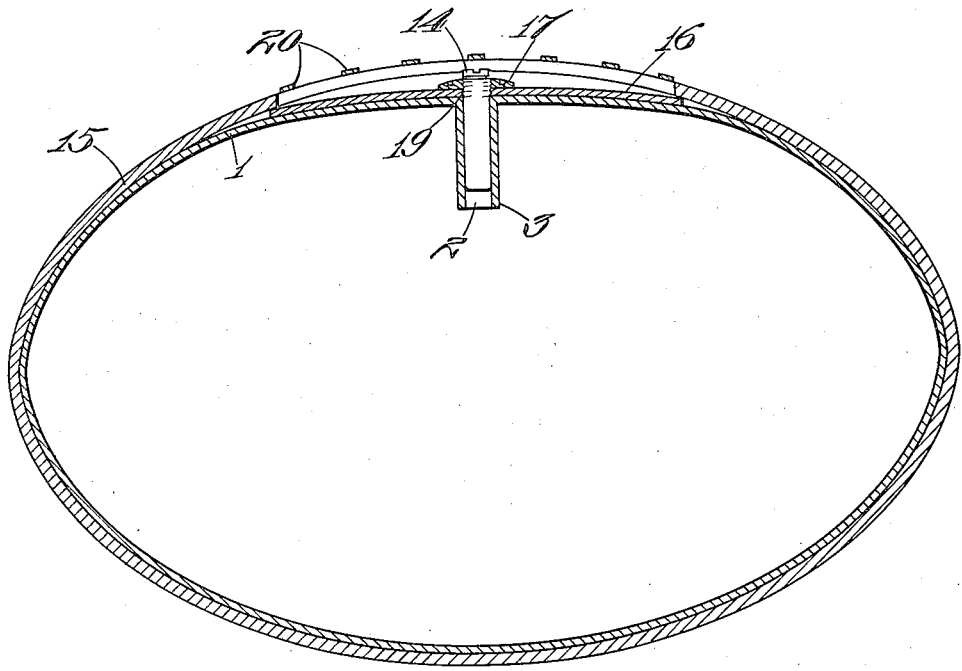

In the drawings, Fig. 1 is a longitudinal section of a ball embodying the invention.

Figure 2:
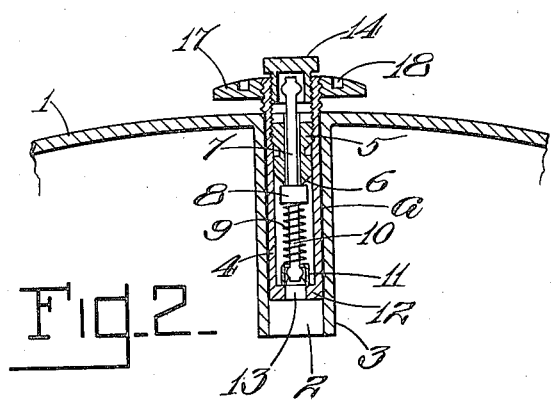

Fig. 2 is an enlarged sectional view of a portion of the bladder having the bladder stem and the valve combined in accordance with the invention.

Referring now to the drawings, at 1 is shown a bladder of thin sheet rubber or other suitable material impervious to air. At 2 is shown the opening for inflating the ball, said opening being surrounded by a stem 3 which is also made of rubber and is connected with the body of the bladder and extends inwardly into the interior of the bladder. This stem 3 is permanently connected with the body of the bladder in such manner as to be practically integral therewith. Preferably it should be vulcanized into combination with the body of the bladder. At 4 is a valve casing which extends inwardly into the said rubber stem 3 and is permanently secured thereto, preferably by cement as shown at *a* in Figure 2 or by vulcanization. The valve employed is preferably of the Schrader type. A valve member 5 is screwed into said valve casing, said member 5 and valve casing being screw-threaded as appears in the drawings for that purpose.

On the lower end of the valve member 5 is a valve seat 6. The valve stem 7 passes down through the member 5 and is provided with a closure member 8 which is normally retained seated upon the said valve seat 6 to close the valve by means of a spring 9 coiled around the stem extension 10, one end of said spring being seated against the under side of the closure member 8 and the lower end being seated upon a slotted cradle member 11, said cradle member 11 being seated upon the lower end 12 of the valve casing 4. The said stem 10 passes loosely through said cradle member 11. The cradle member 11 is slotted to provide ports communicating with the aperture 13 in the lower end of the valve casing, said aperture 13 opening into the lower part of the valve casing and thence communicating with the interior of the bladder.

Normally the closure member 8 is retained seated upon the valve seat 6, so that the bladder is air tight. The valve is provided with a cap 14. By removing the cap the valve may be connected with an air pump through which the bladder may be inflated, the pressure of the air when forced into the bladder causing the closure member 8 to be unseated to admit the air to the bladder and as soon as the operation of the air pump is stopped the closure member 8 will immediately become seated by means of the spring 10 to prevent the escape of the air.

By means of a suitable gauge of any well known construction, the air pressure within the bladder while it is being blown up may be determined any time and the operation of the pump may be stopped as soon as the air pressure reaches a predetermined degree as indicated by the gauge. The operation of the pump will then be stopped and as the valve will be immediately closed there will be no loss of air pressure. Thus it will be seen that the bladder may be blown up to any predetermined degree of pressure, and if a standard of pressure for all balls for a certain use, such for instance as footballs or basket balls, has been established, then it is easy to blow up any ball to the same standard pressure. By means of a suitable gauge the pressure may also be determined at any time after the ball has been blown up. At 15 is shown a cover of usual formation provided with a flap 16 secured to the cover. In order to secure the bladder to the cover a screw washer 17 is provided which is tapped out in a manner to be threaded over the threaded exterior of the valve casing 4. The washer 17 is provided with holes 18 by means of which a spanner wrench can be used to set the washer down tight.

In attaching the bladder to the flap the outer end of the valve casing is thrust through an aperture 19 in the flap while the threaded washer 17 is removed from the valve casing, then the said washer 17 is screwed down to tightly clamp the flap to the bladder 1. The bladder is then inflated and the cap 14 is screwed in to close the end of the valve. The slit in the cover will then be closed by drawing up the lacings 20 in the usual manner.

If the rubber stem of the bladder protruded outward there is no way at present known for retaining the air in the bladder after it is blown up except by winding a rubber band or string around the stem. After such a ball is inflated, the stem has to be bent over, fastened with a rubber band or otherwise and pushed under the cover. There is no way of inflating it uniformly to a predetermined pressure, as it is impossible to regulate it.

By the form of construction according to my invention above described, it is a very simple matter to test the pressure in the bladder by means of a gauge, as the bladder is being inflated, and to stop the further inflation when the desired pressure is reached, also to test its pressure at any time after it has been inflated.

What I claim is:

1. An inflated ball having a bladder composed of thin, flexible material and having a tubular stem integral therewith extending into the interior of the bladder, in combination with a valve having a casing secured to the inner periphery of said stem and projecting some distance outside of the bladder, the protruding portion of said valve casing being screw threaded on its outer periphery in combination with a screw-threaded washer which is separable from the valve casing and which is adapted to be screwed down on the valve casing to clamp a cover to the bladder.

2. An inflated ball having a bladder composed of thin, flexible material impervious to wear and having a tubular stem integral with the bladder extending into the interior thereof, in combination with a valve having a casing secured to the inner periphery of the said stem and projecting for some distance outside of the bladder, a cover for enclosing said bladder separable therefrom having a flap formed with a hole through which said protruding stem of the casing loosely passes, said valve casing and cover being separable from each other, in combination with a screw threaded washer which is separable from the valve casing to permit the valve casing to be passed through the hole in the cover flap to permit the ready assembling of the bladder and the cover, and the separation of the same from each other, said washer being adapted to be screwed onto said valve casing when the bladder and cover are assembled to clamp the said flap to the bladder, thereby securing the cover to the bladder.

3. An inflated ball having a bladder composed of thin flexible material impervious to air and having a flexible tubular stem integral with the bladder and extending into the interior of the bladder, in combination with a valve having a casing permanently secured to the inner periphery of the said stem and projecting outside of the bladder, a cover for enclosing said bladder having a flap attached thereto and formed with a hole through which said protruding stem of the valve casing extends, the outer portion of said valve casing being screw-threaded, in combination with a screw-threaded washer which screws upon said valve casing and clamps said flap to the bladder, thereby securing the cover to the bladder.

In testimony whereof I affix my signature

REX H. TAYLOR.